United States Patent [19]

Yoshinouchi et al.

[11] Patent Number: 4,942,481
[45] Date of Patent: Jul. 17, 1990

[54] CONTACT-TYPE IMAGE SENSOR

[75] Inventors: Atsushi Yoshinouchi, Ohjichohon; Masataka Itoh, Nara; Shuhei Tsuchimoto, Nara; Keiji Tarui, Nara; Satoshi Nishigaki, Nara, all of Japan

[73] Assignee: Sharp Kabushiki Kaisha, Osaka, Japan

[21] Appl. No.: 217,681

[22] Filed: Jul. 11, 1988

[30] Foreign Application Priority Data

Jul. 17, 1987 [JP] Japan .................. 62-179635
Sep. 30, 1987 [JP] Japan .................. 62-247661
Dec. 26, 1987 [JP] Japan .................. 62-334622
Dec. 26, 1987 [JP] Japan .................. 62-199094

[51] Int. Cl.$^5$ ............................. H04N 1/40
[52] U.S. Cl. .......................... 358/471; 358/484
[58] Field of Search ............. 358/484, 482, 483, 471; 250/570, 227, 234

[56] References Cited

U.S. PATENT DOCUMENTS 3,183,815  5/1965  Kapany et al. .
4,408,230  10/1983 Tamura et al. ................. 358/484
4,559,564  12/1985 Itoh et al. ..................... 358/484
4,598,975  7/1986  Bussard et al. .
4,652,753  3/1987  Harano et al. ................. 358/484
4,743,089  5/1988  Sakakibara et al. ............ 358/484

FOREIGN PATENT DOCUMENTS 1228926  11/1966 Fed. Rep. of Germany .
3206620  8/1983  Fed. Rep. of Germany .
2159365  11/1985 United Kingdom .

Primary Examiner—Edward L. Coles, Sr.
Attorney, Agent, or Firm—Irell & Manella

[57] ABSTRACT

A contact-type image sensor comprising a light source that illuminates the manuscript to be read; photodetectors that convert the light reflected by the manuscript into an electrical signal; a substrate that is disposed between the photodetectors and the manuscript; an optical fiber array that is constituted by a bundle of optical fibers that are buried in the substrate, the optical fiber array introducing the reflected light from the manuscript into the light-receiving surfaces of the photodetectors; and a light-absorbing substance that is disposed on the outer surface of each of the optical fibers, wherein the light-absorbing substance is disposed on the outer surface of each of the optical fibers, except for the region with a given length from the end of the optical fiber array that faces the manuscript.

2 Claims, 7 Drawing Sheets

CONTACT-TYPE IMAGE SENSOR

BACKGROUND OF THE INVENTION

1. Field of the invention

This invention relates to a contact-type image sensor that can be used in a facsimile apparatus, an input apparatus for the reading of letters and images.

2. Description of the prior art

In conventional input apparatuses for the reading of letters and images by the use of line sensors, the manuscript is irradiated with fluorescent light or light from LED (light-emitting diode) arrays, and the reflected light from the manuscript (i.e., the information of the manuscript) reaches the sensors through optical lens, rod array lenses, or optical fibers. By shifting the manuscript or the sensors, two-dimensional information can be read from the manuscript. As such input apparatuses, there are mainly two kinds of apparatuses, one of which comprises a combination of charge coupled devices (CCD) and optical lenses, and the other of which comprises a combination of narrow strip image sensors and rod lens arrays or optical fiber arrays. Especially the latter, called contact-type image sensors, has been developed in recent years for use in a facsimile apparatus to thereby miniaturize the facsimile apparatus and reduce its production cost.

However, most of the above-mentioned contact-type image sensors are designed so that the information of the manuscript generally can reach the sensors through the rod lens arrays, resulting in a limited miniaturization of the sensors. The manuscript must be kept apart from the sensor by the conjugate length of the rod lens arrays, so the thickness of a unit of the contact-type image sensor is 20-30 mm. Moreover, since a lens system is used in the sensor, there is need for optical adjustment. and the transmittance of light is low.

In contrast, apparatuses using optical fibers instead of such a lens system do not necessitate optical adjustment, but they attain a high transmittance of light. Moreover, since there are no lenses that focus, the optical fibers can be made short, which results in a miniaturization of the apparatus. However, light that is incident upon the optical fibers at angles of a certain value or more do not attain total reflection at the interface between the wall of each of the optical fibers and the clad formed between the adjacent optical fibers, and the light reaches the adjacent optical fiber through the clad. Moreover, light that is incident upon the clad, first, reaches the sensor-side end of the bundle of optical fibers through the clad. Such light leakage reduces the quality of images. To overcome this problem, EMA (extra mural absorption)-type optical fiber arrays that are constituted by optical fibers with a light-absorbing substance disposed between the adjacent optical fibers have been proposed. When these EMA-type optical fiber arrays are applied to a contact-type image sensor, it is impossible to irradiate the manuscript with light from a light source because of the light-absorbing substances disposed among the optical fibers.

SUMMARY OF THE INVENTION

The contact-type image sensor of this invention, which overcomes the above-discussed and numerous other disadvantages and deficiencies of the prior art, comprises a light source that illuminates the manuscript to be read; photodetectors that convert the light reflected by the manuscript into an electrical signal; a substrate that is disposed between said photodetectors and said manuscript; an optical fiber array that is constituted by a bundle of optical fibers that are buried in said substrate, said optical fiber array introducing said reflected light from said manuscript into the light-receiving surfaces of said photodetectors; and a light-absorbing substance that is disposed on the outer surface of each of said optical fibers, wherein said light-absorbing substance is disposed on the outer surface of each of the optical fibers, except for the region with a given length from the end of said optical fiber array that faces said manuscript. The light-receiving surfaces of said photodetectors closely face the light-emitting face of the bundle of optical fibers.

Thus, the invention described herein makes possible the objectives of (1) providing a contact-type image sensor in which a light-absorbing substance is disposed between the adjacent optical fibers, except for the vicinity of the position of the manuscript to be read, so that the manuscript can be irradiated with light from a light source, and even when a part of the light reflected by the manuscript leaks out through the wall of each optical fiber while the light is passing through the optical fibers toward the light-receiving surface of each photodetector, the light leakage is absorbed by the said light-absorbing substance disposed between the optical fibers, thereby maintaining the resolution of the photodetectors at a high level; (2) providing a contact-type image sensor in which an optical path length can be freely set by the use of optical fibers, which results in a miniaturized sensor; (3) providing a contact-type image sensor in which the photodetectors and the optical system are produced separately from each other, which enables the manufacture of the sensor with a high yield; and (4) providing a contact-type image sensor in which the photodetectors and the substrate holding the optical fibers are incorporated into one body in such a manner that the light-emitting face of the bundle of optical fibers faces the light-receiving surface of each photodetector, so that the focal adjustment of lenses becomes unnecessary, resulting in higher productivity and a reduction of production cost.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

This invention provides a contact-type image sensor wherein a plurality of photodetectors are disposed in a line in such a manner that the light-receiving surfaces of the photodetectors face the light-emitting face of a bundle of optical fibers that are buried in a substrate; wiring electrodes that are disposed on the substrate are bonded to wiring electrodes that are disposed on the light-receiving surfaces of the photodetectors by the use of solder bump bonding or the like; and a light-absorbing substance is disposed between the adjacent optical fibers, except for the region with a given length from the end of the bundle of optical fibers that faces the manuscript. In this way, the distance between the light-emitting face of the bundle of optical fibers and the light-receiving surfaces of the photodetectors can be set at a distance at which a given modulation transfer function (MTF) can be attained. Moreover, the manuscript can be irradiated with light from a light source, and even when a part of light reflected by the manuscript leaks out through the wall of each optical fibers while the light is passing through the optical fibers toward the photodetectors, the light leakage is absorbed by the said light-absorbing substance disposed between the optical fibers, so that a reduction of the image quality at the light-emitting face of the optical fiber array (namely, the light-receiving surfaces of the photodetectors) can be prevented, resulting in a miniaturized contact-type image sensor that necessitates no optical adjustment and produces a high-quality image.

EXAMPLE 1

Figure 1:
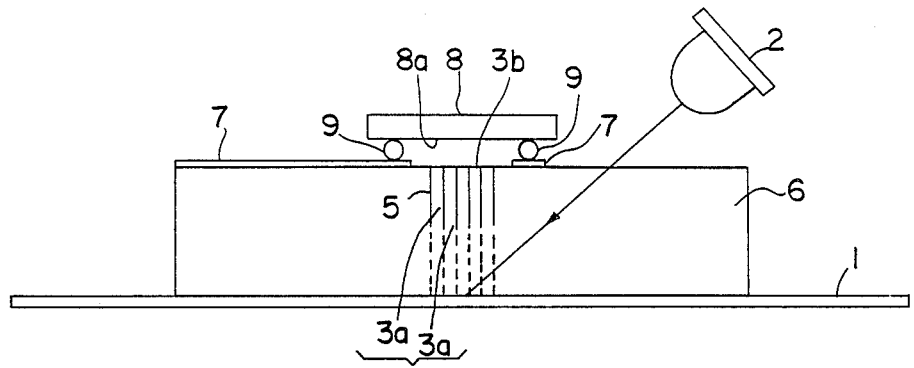
FIG. 1 is a front view showing a contact-type image sensor of this invention.

FIG. 1 shows a contact-type image sensor of this invention, which comprises a light source 2 such as an LED (light-emitting diode) array that illuminates the manuscript 1 to be read, photodetectors 8 that convert the light reflected by the manuscript 1 into an electrical signal, and a light-permeable insulating substrate 6 that is disposed between the photodetectors 8 and the manuscript 1. A bundle of optical fibers 3a that constitute an optical fiber array 3 are buried in the substrate 6. Wiring electrodes 7 are disposed on the top surface of the substrate 6. The wiring electrodes 7 on the substrate 6 are bonded to wiring electrodes 10 (FIGS. 3a and 3b) that are disposed on the light-receiving surfaces 8a of the photodetectors 8 by the use of solder bumps 9.

Figure 2:
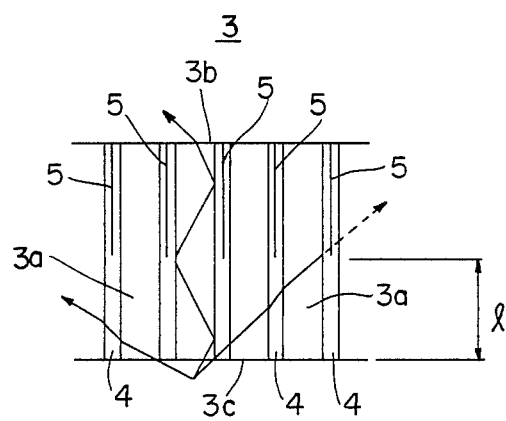
FIG. 2 is a front view showing the enlarged portion of the optical fiber array of the contact-type image sensor of FIG. 1.

A light-absorbing substance 5 is disposed between the adjacent optical fibers 3a and 3b, as shown in FIG. 2, except for the region with a given length l from the end 3c of the optical fiber array 3 that faces the manuscript 1, resulting in a hybrid-type optical fiber array through which the manuscript 1 can be irradiated with light from the LED array light source 2. The wording "the region with a given length l from the end of the optical fiber array" means that there is no light-absorbing substance over the region with a length l so that light from the light source 2 can be incident upon the surface of the manuscript 1 through the optical fibers 3a. Although this example discloses that the light-absorbing substance 5 is disposed from the upper end of a gap between the adjacent optical fibers 3a to the middle of the gap thereof, the light-absorbing substance 5 can be disposed at any position in the gap between the adjacent optical fibers 3a, except for the region with a length l from the end 3c of the optical fiber array 3 so long as the light leakage from the walls of the optical fibers 3a is absorbed by the light-absorbing substances 5.

A plurality of photodetectors 8 are arranged in a line over the substrate 6 so that the total length of the photodetectors 6 becomes equal to the width of the manuscript 1 in the longitudinal direction of the substrate 6.

Figure 3A:
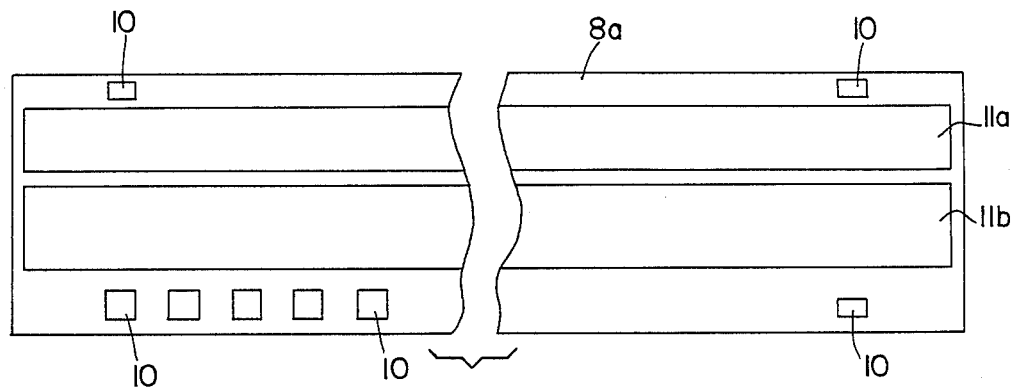
FIGS. 3a and 3b, respectively, are a plane view and a sectional view showing the photodetector used in the contact-type image sensor of FIG. 1.
Figure 3B:
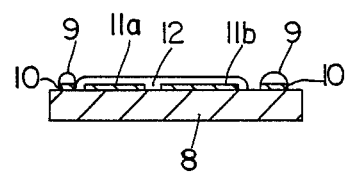

The above-mentioned contact-type image sensor is produced as follows: As the photodetector 8, a CCD sensor with a resolution of 8 dots/mm and a length of about 70 mm shown in FIGS. 3a and 3b is used, wherein on the light-receiving surface 8a of each photodetector 8, in order to prevent a reduction of the resolution at the boundaries among the photodetectors 8, the light-receiving section 11a and the signal-transferring section 11b are formed over the entire area of the light-receiving surface 8a in the longitudinal direction thereof, and moreover a number of wiring electrodes 10 are formed outside of these light-receiving and signal-transferring sections 11a and 11b in the width direction of the light-receiving surface 8a. On the light-receiving surface 8a including the light-receiving section 11a and the light-transferring section 11b, as shown in FIG. 3b, a passivation film 12 of $Si_xN_{1-x}$ ($0<x<1$) or $SiO_2$ is formed by a thin film formation technique. Solder bumps 9 are formed on the wiring electrodes 10.

Figure 4:
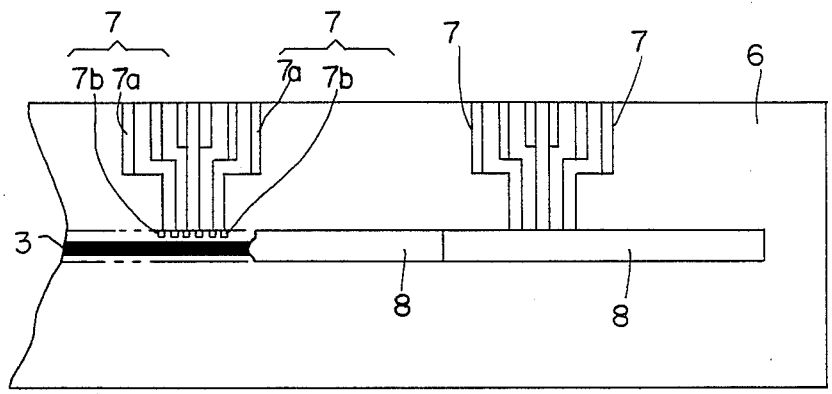
FIG. 4 is a plane view showing the contact-type image sensor of FIG. 1.

The optical fibers 3a are made of quartz glass fibers or multiple-ingredient glass fibers, which are bound into a bundle, resulting in an optical fiber array 3, which is then sandwiched between the halves of the substrate 6 (FIG. 4). Then, on the top surface of the substrate 6, wiring 7a and terminals 7b of the wiring electrodes 7 are made of thin films by the use of a fine processing technique. The terminals 7b contact the solder bumps g formed on the photodetectors 8.

The photodetectors 8 are then disposed in a line in such a manner that the light-receiving sections 11a of the photodetectors 8 face the light-emitting face of the bundle of optical fibers 3a, and the wiring electrodes 10 of the photodetectors 8 are bonded to the terminals 7b of the substrate 6 by the reflow bonding method by which the solder bumps 9 are melted by heating it at 180° C. -350° C. in a furnace (FIGS. 1 and 4). In this way, the bonding of the photodetectors 8 to the substrate 6 is carried out for the purposes of a fixation and an electrical connection of the photodetectors 8 to the substrate 6.

The above-mentioned production process of this contact-type image sensor makes it easy to adjust the positional deviation between the light-receiving surfaces 8a of the photodetectors 8 and the light-emitting face 3b of the bundle of the optical fibers 3a by the use of solder bump bonding that attains the self-alignment effect. Moreover, because of the use of the optical fiber array 3 instead of optical lenses, the optical path length can be freely set, which results in a miniaturized sensor, and also the focal adjustment of lenses becomes unnecessary, which results in an improvement of productivity and a reduction of production cost. Moreover, a distance between the light-receiving surfaces 8a of the photodetectors 8 and the light-emitting face 3b of the bundle of optical fibers 3a can be set to be as small as possible, which allows the manuscript 1 to be read with a high resolution. The photodetectors 8 and the substrate 6 that holds an optical fiber array 3 therein can be separately manufactured, which enables a high-yield production of the sensors.

Figure 6A:
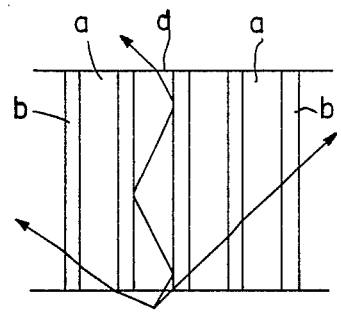
FIG. 6a is a front view showing the enlarged portion of a clear-type optical fiber array used in conventional contact-type image sensors.
Figure 6B:
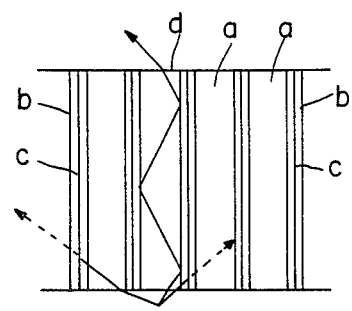
FIG. 6b is a front view showing the enlarged portion of an EMA-type optical fiber array used in conventional contact-type image sensors.

In the above-mentioned contact-type image sensor of this invention with a hybrid-type optical fiber array, as mentioned above, the light that is leaking out through the walls of the optical fibers 3a is completely absorbed by the light-absorbing substances 5 disposed in gaps among the optical fibers 3a (FIG. 2) in the same way as that of conventional contact-type image sensors with an EMA-type optical fiber array (FIG. 6b) in which a light-absorbing substance c is disposed in the entire area of a gap b between the adjacent optical fibers a.

Figure 5:
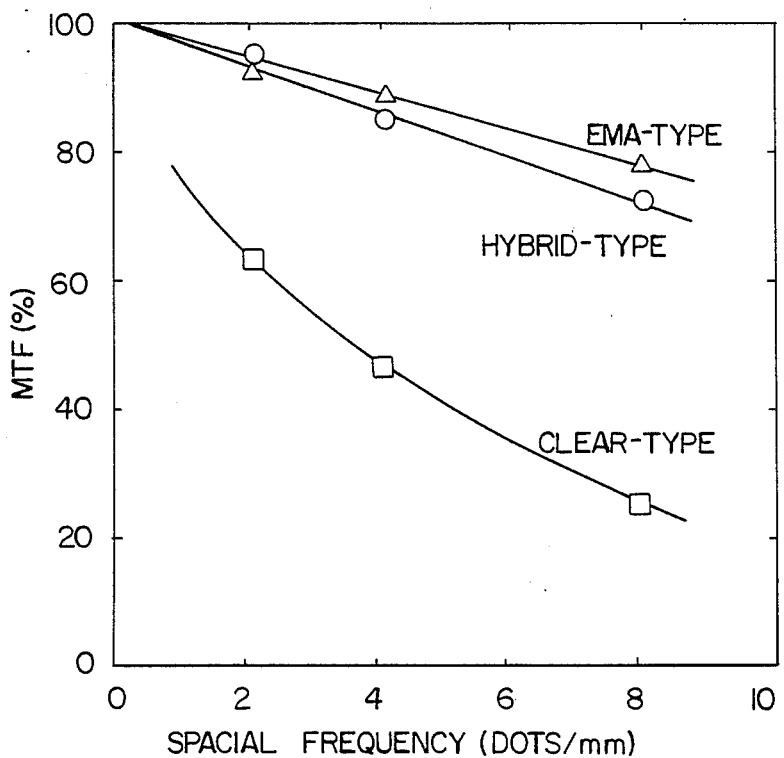
FIG. 5 is of characteristic curves showing the relationship between the spacial frequency and the modulation transfer function (MTF) with regard to sensors with a variety of optical fiber arrays.

FIG. 5 shows the relationship between the spacial frequency and the modulation transfer function (MTF) with regard to the sensors with a variety of structures for optical fiber arrays, indicating that the contact-type image sensor of this invention with a hybrid-type optical fiber array (FIG. 2) exhibits excellent MTF characteristics that are the same as those of a conventional contact-type image sensor with an EMA-type optical fiber array (FIG. 6b), whereas a conventional contact-type image sensor with a clear-type optical fiber array (FIG. 6a) in which no light-absorbing substance is disposed in a gap b between the adjacent optical fibers a exhibits inferior MTF characteristics because of light leakages through the walls of the optical fibers.

With the contact-type image sensor of this example shown in FIG. 1, if the distance between the light-receiving surfaces 8a of the photodetectors 8 and the light-emitting face 3b of the optical fiber array 3 is two times or more the pitch of a resolution of the photodetectors needed, the MTF will be reduced, and thus the said distance therebetween must be set to be less than two times the resolution pitch of the photodetectors. Table 1 shows the MTFs of the contact-type image sensors that are provided with a clear-type optical fiber array, an EMA-type optical fiber array, and a hybrid-type optical fiber array, respectively.

TABLE 1

| Kinds of optical fiber array | Illumination of manuscript | MTF |
|---|---|---|
| Clear-type | Possible | Inferior |
| EMA-type | Impossible | Superior |
| Hybrid-type | Possible | Superior |

Although the above-mentioned example only discloses a CCD sensor with a resolution of 8 dots/mm and a length of about 70 mm as a photodetector, this invention is, of course, applicable to other IC sensors and thin film sensors.

Example 2

Figure 7:
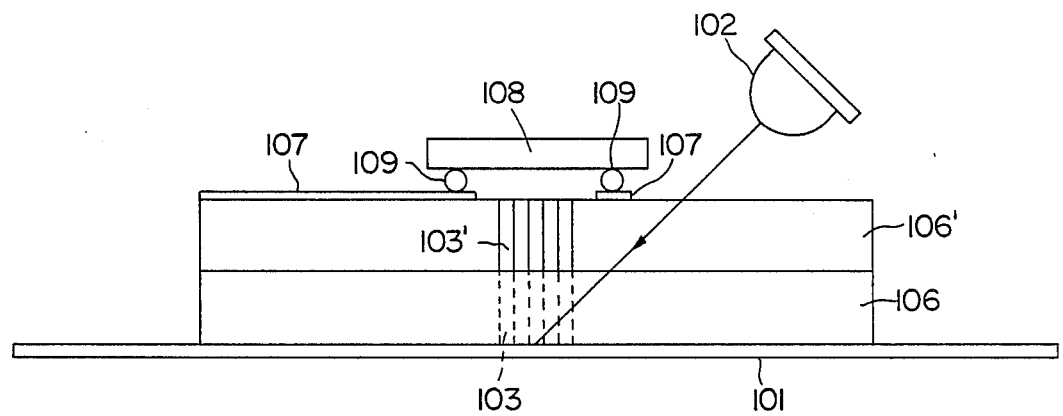
FIG. 7 is a sectional view showing another contact-type image sensor of this invention.

FIG. 7 shows another contact-type image sensor of this invention, which comprises an LED array light source 102 that illuminates the manuscript 101 to be read, CCD chips 108 as photodetectors that convert the light reflected by the manuscript 101 into an electrical signal, and light-permeable insulating substrates 106 and 106' that are disposed between the photodetectors 108 and the manuscript 101. An optical fiber array 103 that is constituted by a bundle of optical fibers covered by no light-absorbing substance is buried in the substrate 106. An optical fiber array 103' that is constituted by a bundle of optical fibers covered by a light-absorbing substance is buried in the substrate 106'. The substrates 106' is disposed on the substrate 106 in such a manner that the optical fiber array 103' is optically connected to the optical fiber array 103. Wiring electrodes 107 are disposed on the top surface of the substrate 106'. The wiring electrodes 107 on the substrate 106' are bonded to wiring electrodes (not shown) that are disposed on the light-receiving surfaces of the photodetectors 108 by the use of solder bumps 109.

Light from the light source 102 illuminates the manuscript 101 through the light-permeable substrate 106' and 106 and the optical fiber array 103 that is provided with no light-absorbing substance. The light reflected by the manuscript 101 (namely, the light bearing the image information from the manuscript 101) passes through the optical fiber array 103 that is provided with no light-absorbing substance and the optical fiber array 103' that is provided with a light-absorbing substance, and then reaches the photodetectors 108. Although a part of the reflected light leaks out through the wall of the optical fiber array 103' while the reflected light is passing through the optical fiber array 103', it is absorbed by the light-absorbing substance and only light that is needed a image information is incident upon the photodetectors 108. Thus, light from the light source 102 effectively illuminates the manuscript 101 and reaches the photodetectors 108 without a reduction of the image quality.

In this way, a miniaturized contact-type image sensor with a high resolution that necessitates no optical adjustment can be obtained. This sensor can be mass-produced.

Example 3

Figure 8:
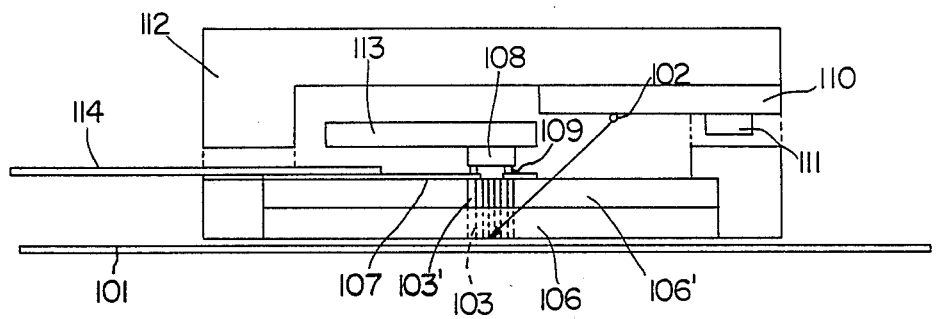
FIG. 8 is a sectional view showing another contact-type image sensor of this invention.

FIG. 8 shows another contact-type image sensor of this invention, which comprises a light source 102 such as an LED array having no rod lenses that illuminates the manuscript 101, photodetectors 108 such as CCD chips, and light-permeable substrates 106 and 106' that are disposed between the photodetectors 108 and the manuscript 101. An optical fiber array 103 that is constituted by a bundle of optical fibers without any light-absorbing substance is incorporated into the substrate 106. An optical fiber array 103' that is constituted by a bundle of optical fibers with a light-absorbing substance is incorporated into the substrate 106'. Wiring electrodes 107 are disposed on the substrate 106'. The wiring electrodes 107 on the substrate 106' are bonded to wiring electrodes (not shown) that are disposed on the photodetectors 108 by the use of solder bumps 109.

The light source 102 is mounted on a substrate 110, on which a resistance 111 is disposed. A housing 112 holding the substrate 110 with the light source 102 therein functions as a heat-releasing plate by which heat from the LED array 102 is released. A plate 113 that is positioned above the photodetectors 108 functions to release the heat from the photodetectors 108. Reference numeral 114 is a flexible printed-substrate that is electrically connected to the wiring electrodes 107.

In this way, by the use of the LED array 102 that has no rod lenses as a light source with a light-emitting peak wavelength of 570 nm, uniform illumination (e.g., the luminous intensity on the photodetectors 108 being 100 lx) and miniaturization of the sensor unit (e.g., a thickness of 7 mm, a width of 19 mm, and a length of 50 mm) can be attained. Thus, a miniaturized contact-type image sensor that does not necessitate an optical adjustment but attains a high resolution can be obtained. This sensor can be mass-produced.

Figure 9:
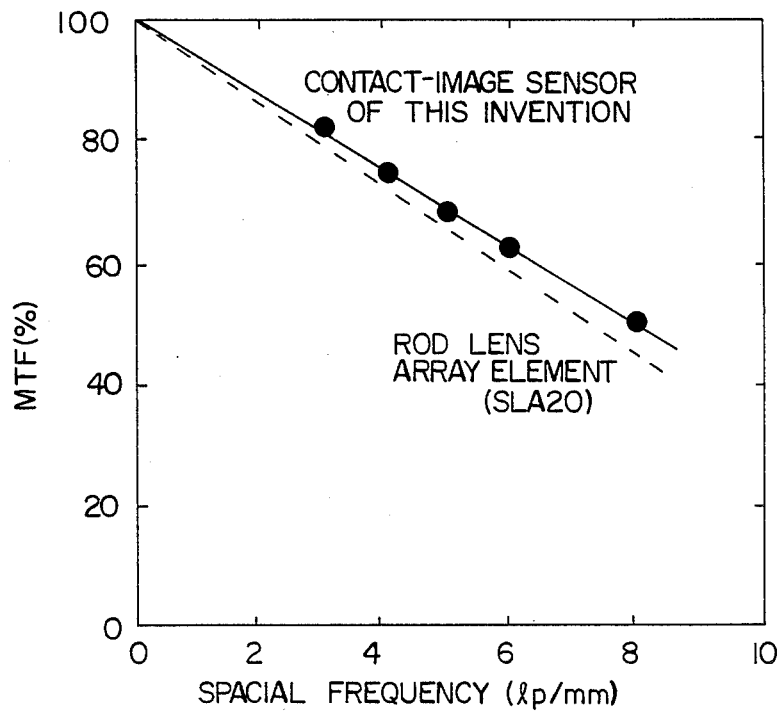
FIG. 9 is of characteristic curves showing the relationship between the spacial frequency and the MTF with regard to the image sensor shown in FIG. 8.

FIG. 9 shows the relationship between the spacial frequency and the MTF with regard to the contact-type image sensor of this example and a rod lens array element (SLA 20), indicating that the said sensor has an MTF of 50% at a spacial frequency of 8 lp/mm that is clearly superior to the MTF of a conventional contact-type image sensor with a rod lens array element (SLA 20) in view of the fact that the MTF of this conventional contact-type image sensor with the rod lens array element is inferior to that of the rod lens array element.

EXAMPLE 4

Figure 10:
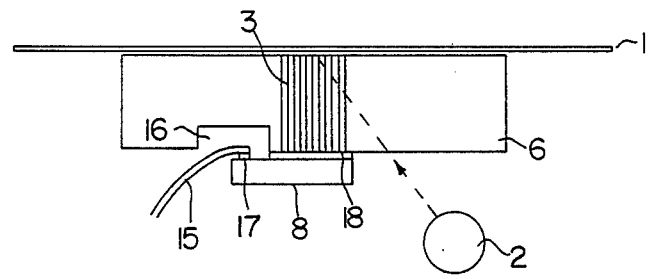
FIG. 10 is a sectional view showing another contact-type image sensor of this invention.

FIG. 10 shows another contact-type image sensor of this invention, in which a pit 16 is formed in the substrate 6 so that the photodetectors 8 can be electrically connected to film carriers 15 at the points 17, and the photodetectors 8 are adhered to the substrate 6 by means of optical setting resin 18 in such a manner that the light-receiving surfaces of the photodetectors face the light-emitting face of the bundle of optical fibers 3 that are buried into the substrate 6. Instead of the film carriers 15, metal wiring can be, of course, used to connect the photodetectors 8 to a control circuit (not shown) by means of the wire bonding method or the like.

EXAMPLE 5

Figure 11:
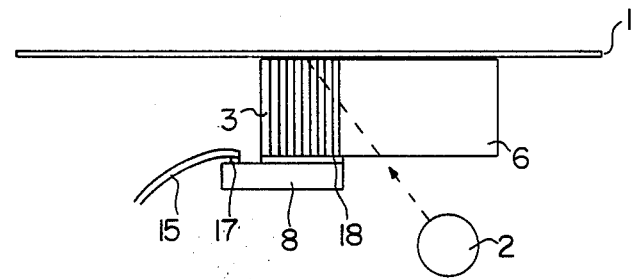
FIG. 11 is a sectional view showing another contact-type image sensor of this invention.

FIG. 11 shows another contact-type image sensor of this invention, which has the same structure as that of Example 4 shown in FIG. 10, except that the portion of the substrate 6 is removed so that the photodetectors 8 can be electrically connected to the film carriers 15 at the points 17.

EXAMPLE 6

Figure 12:
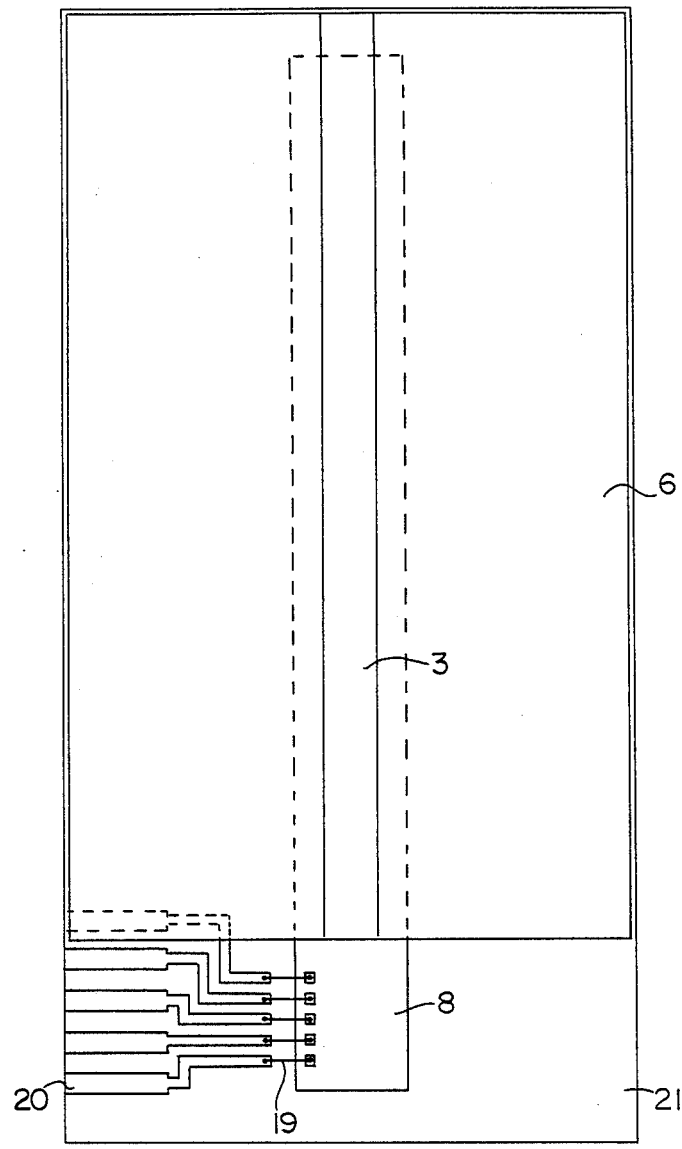
FIG. 12 is a plane view showing another contact-type image sensor of this invention.

FIG. 12 shows another contact-type image sensor of this invention, wherein the photodetectors 8 are mounted on a substrate 21, and the wiring electrodes 20 that are disposed on the substrate 21 are electrically connected to wiring electrodes that are disposed in the vicinity of one end of the light-receiving surface of the photodetector 8 that is positioned at one end of a plurality of photodetectors arranged in a line by means of wire-bondings 19. Instead of the wire bondings 19, film carriers or the like can be used to connect the wiring electrodes of the photodetectors 8 to the wiring electrodes 20 of the substrate 21.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A contact-type image sensor comprising a light source that illuminates the manuscript to be read; photodetectors that convert the light reflected by the manuscript into an electrical signal; a substrate that is disposed between said photodetectors and said manuscript; an optical fiber array that is constituted by a bundle of optical fibers that are buried in said substrate, said optical fiber array introducing said reflected light from said manuscript into the light-receiving surfaces of said photodetectors; and a light-absorbing substance that is disposed on the outer surface of each of said optical fibers, wherein said light-absorbing substance is disposed on the outer surface of each of the optical fibers, except for the region with a given length from the end of said optical fiber array that faces said manuscript.

2. A contact-type image sensor according to claim 1, wherein the light-receiving surfaces of said photodetectors closely face the light-emitting face of the bundle of optical fibers.

* * * * *